Oct. 12, 1965
A. W. BROWN
3,211,350
PRESSURE REGULATING VALVE AND DISPENSER
FOR CARBONATED BEVERAGES
Filed Feb. 13, 1961
2 Sheets-Sheet 1
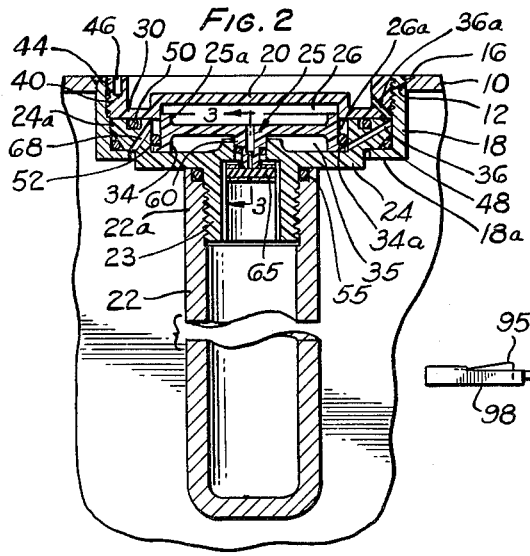
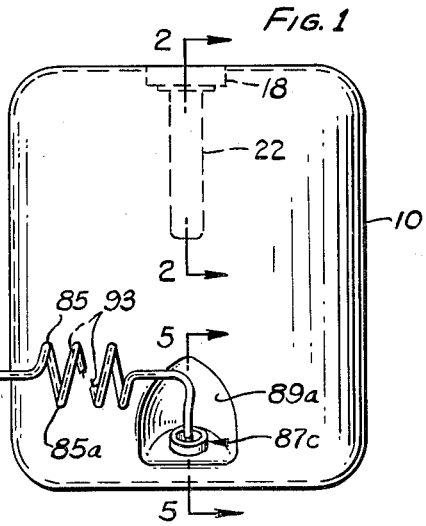
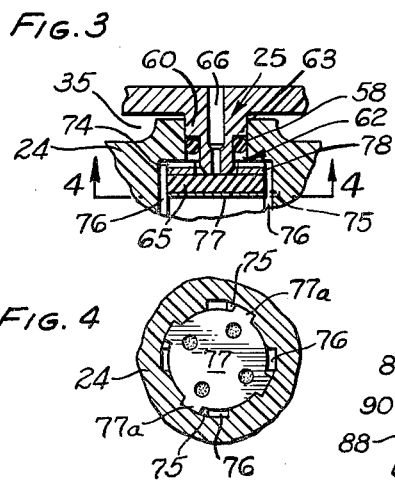
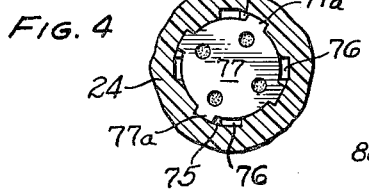
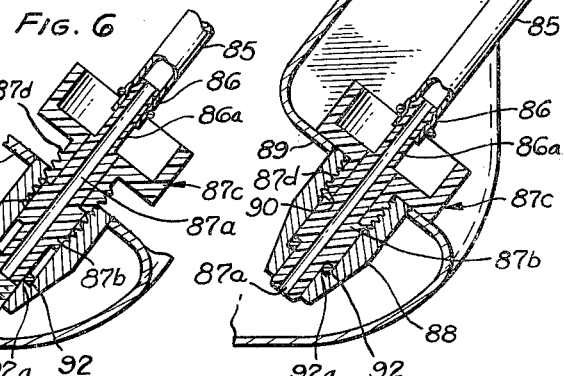
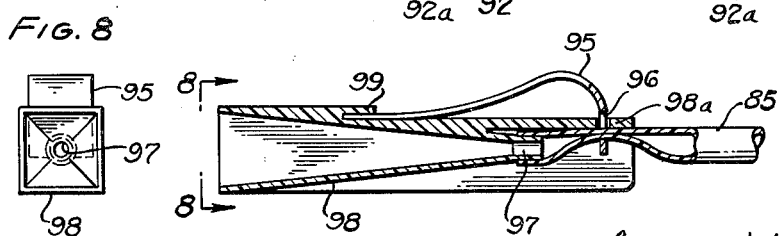
INVENTOR.
ALBERT WILLIAM BROWN
BY HIS ATTORNEYS
HARRIS, KIECH, RUSSELL & KERN

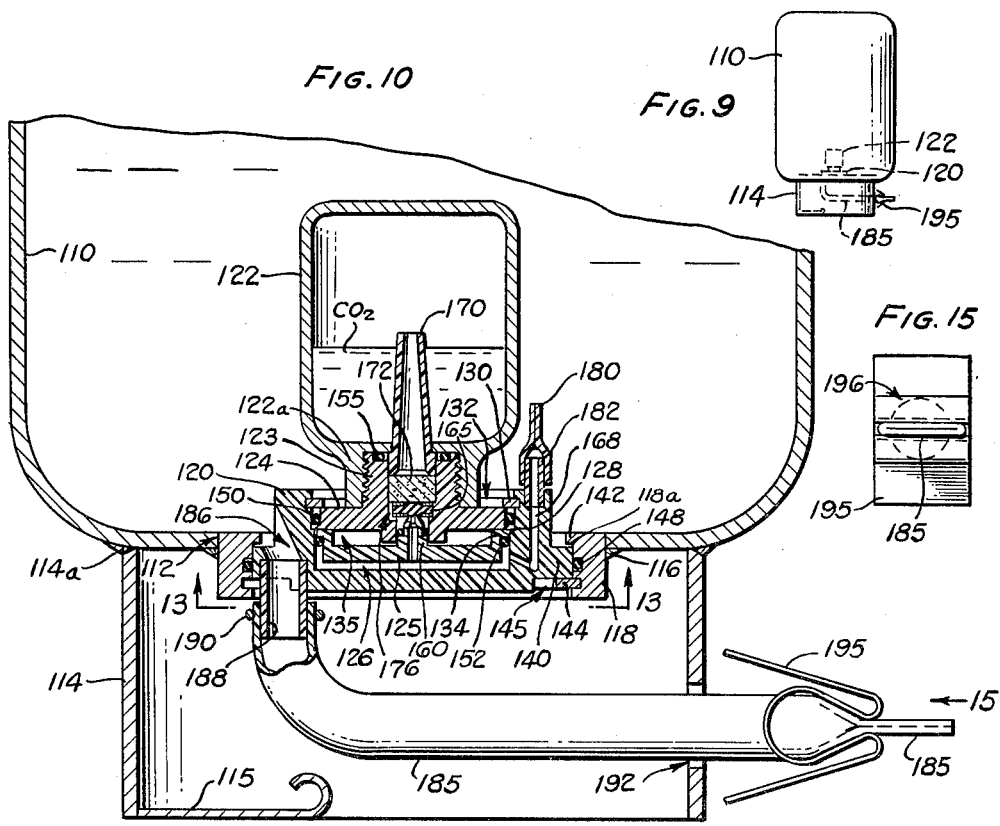
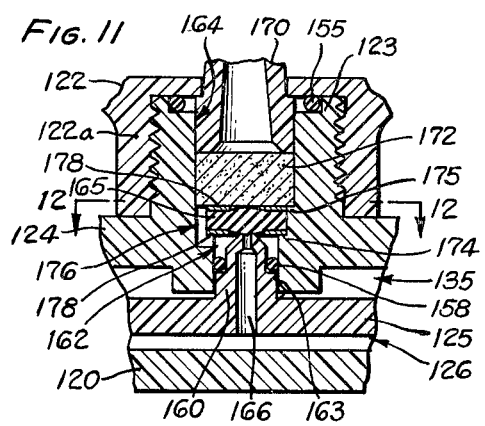
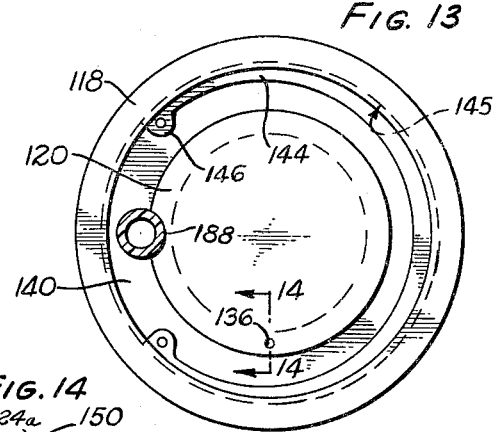
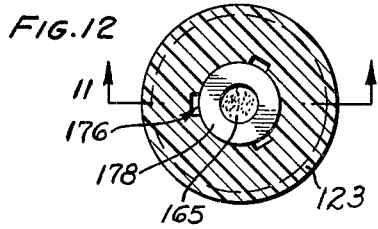
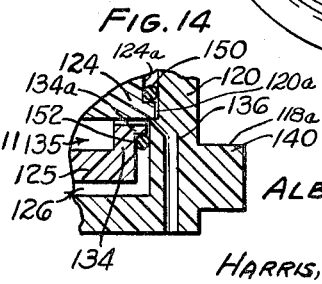

United States Patent Office 3,211,350
Patented Oct. 12, 1965

3,211,350
PRESSURE REGULATING VALVE AND DISPENS-
ER FOR CARBONATED BEVERAGES
Albert William Brown, 1207 Pembroke Lane,
Newport Beach, Calif.
Filed Feb. 13, 1961, Ser. No. 88,737
11 Claims. (Cl. 222—399)

This invention relates to systems for handling carbonated beverages contained in tanks and to dispensing means and regulating valves for carbon dioxide used in pressurizing the tanks.

A principal object of the invention is to provide means of small and compact size that may be used in small dispensing installations, such as small beer dispensing tanks that may be contained in household refrigerators and similar locations. The intended use is also for larger installations such as ¼ barrels (pony) and half barrels or any other sizes that are commercially desirable.

Another object is to provide a small two-part unit attachable to a small carbonated-beverage containing vessel which, together with the vessel, constitutes the entire installation and includes a pressure regulator and a small container for all the carbon dioxide, in either liquefied or solidified form, that will be needed for pressurizing and dispensing the entire charge of beverage in the vessel.

An additional object of the invention is to produce a small, durable and highly efficient unit for pressurizing and dispensing carbonated beverages whose life span is extended by exclusion of short-life parts such as gages, springs, diaphragms, and adjusting mechanisms.

It is also an object to provide a regulating valve structure so simple and inexpensive that it may, if desired, be manufactured as a single-use throw-away item.

It is still another object to construct a simple and inexpensive regulator that may not easily be disturbed by unauthorized or inexperienced persons, may not be easily removed while the vessel is under operating pressure, needs no adjustment, and possesses no adjustment means.

A further object is to provide dispensing means including a pressure reducing and diffusing device to prevent excess foaming of the carbonated beverage as it is dispensed.

It is another object of the invention to provide a combination wherein all of the pressure regulating and pressurizing means and much of the dispensing means are located within the confines of the beverage containing vessel.

In one aspect, this invention relies largely upon a pressure regulator and mounting having rigid inner and outer wall members which contain, between and within them, a rigid monolithic differential piston working in cylinder means between such wall members and under the control of a disc expansion valve, the inner wall member carrying a small carbon dioxide container or flask extending into the beverage vessel and communicaitng with said valve and differential piston for feeding carbon dioxide ($CO_2$) into the beverage vessel to pressurize the beverage and maintain carbonation thereof. The regulator is unique in that it utilizes as an accurate reference pressure the vapor pressure of saturated $CO_2$ gas in the flask, and regulates tank pressure to the desired ratio of that value. In another aspect, the invention relies upon dispensing means plugged into the vessel and including a valve-controlled flexible tube containing in a coil thereof a coil spring which graduates pressure drop in the dispensing beverage and reduces foaming in cooperation with a flared or tapered diffusing nozzle.

Other objects of the invention will become apparent to those skilled in this art upon reference to the accompanying specification and drawings which disclose a presently preferred form and a modification. In the drawings:

FIG. 1 is an elevational view of a beverage tank equipped with the present improvement, the regulating pressurizer being indicated in broken lines and the dispensing means in solid lines;

FIG. 2 is an enlarged vertical section through the regulating pressurizer as indicated by the line 2—2 of FIG. 1;

FIGS. 3 and 4 are enlarged sectional details taken from the lines 3—3 and 4—4 of FIGS. 2 and 3;

FIG. 5 is an enlarged sectional view from the line 5—5 of FIG. 1;

FIG. 6 is a view similar to that of FIG. 5 and indicating an installation step;

FIG. 7 is an enlarged vertical sectional detail through the dispensing nozzle of FIG. 1;

FIG. 8 is an end elevation indicated by the line 8—8 of FIG. 7;

FIG. 9 is an elevational view of a modified form of beverage tank, a modified form of pressurizing and dispensing means being indicated in broken lines;

FIG. 10 is an enlarged vertical sectional view showing the construction and arrangement of the parts of FIG. 1;

FIG. 11 is a further enlarged vertical sectional detail of the valving mechanism and associated parts of FIG. 10 as seen from the line 11—11 of FIG. 12;

FIG. 12 is a cross section on the line 12—12 of FIG. 11;

FIG. 13 is a plan view of the bottom of the unit as viewed from the line 13—13 of FIG. 10;

FIG. 14 is a fragmentary vertical section similar to that of FIG. 11 and taken on the line 14—14 of FIG. 13 to show a venting duct; and FIG. 15 is an elevational detail taken in the direction of the arrow 15 to show a clamping arrangement.

According to the preferred form of the invention shown in FIGS. 1 to 8, the beverage container is represented as a stainless steel tank or similar vessel 10 which is provided at its top with an opening 12 having welded therein, as indicated at 16, an annular mounting ring 18 which operatively receives in removable sealed relation a circular outer wall member or plug-like body member 20 of monolithic construction which serves to retain within the tank 10 a small steel pressurizing flask or container 22 for liquid or solid carbon dioxide ($CO_2$) which operates the system.

For the purpose of directly supporting the flask 22 and carrying regulator valve means, a depending boss 23 and an inner wall member 24 with which the boss is integral are mounted on the ring 18. An internally threaded neck portion 22a of the flask 22 is secured on external threads of the boss 23, whereby to suspend the flask 22. The inner wall member 24 is provided with an integral upwardly offset annular flange or shoulder member 24a which is borne upon an inwardly directed annular flange or shoulder 18a integral with the inner end of mounting ring 18, the inner wall member 24 being retained in such position by the outer wall member 20 which acts as a closure and is provided with a downwardly offset integral annular retention flange or shoulder 30 that bears upon and retains a shoulder member 24a of the inner wall member 24.

Disposed between the upper wall member 20 and the lower wall member 24 is a monolithic rigid differential piston 25 that is reciprocably mounted within a stepped cylindrical chamber 26. The upper portion of the cylindrical chamber 26 is provided in the central portion of the outer wall member 20, and an integral upstanding annular wall portion 25a of the piston 25 works therein. The piston 25 also has a depending annular wall portion 34 provided with an annular radial lip 34a which works in a lower portion 26a of the stepped cylinder 26, such cylinder portion 26a being provided within the upwardly offset shoulder portion 24a of the lower wall member 24. Beneath the transverse body portion of the piston 25 and within the depending annular wall portion 34 there is thus provided a chamber 35. This pressure equalizing chamber and working space 35 is vented to the atmosphere by means of a duct 36 leading from an edge portion of the mentioned radial lip 34a of the wall 34 diagonally through the shoulder member 24a of the inner wall member 24 to an adjacent lower corner of the upper and outer wall member 20 where it registers with a duct 36a that communicates with the atmosphere at the outer surface of the member 20.

For the purpose of securing the outer wall member 20 in position, it is provided with an upstanding annular flange or rim 40 which is tightly threaded into the mounting ring 18 by means of cooperating threads indicated at 44. If leakage past the threads 44 is sufficient, such leakage may be relied upon for venting the duct 36 rather than to employ the duct 36a. By turning the outer wall member 20 tightly down upon the annular shoulder member 24a, the inner wall member 24 is snugly secured in sealing relationship. To prevent unauthorized removal of the outer wall member 20, pressure within the system is an aiding factor. Additionally the outer wall member 20 is constructed to require a special wrench. This may be achieved by constructing the outer walls of the central portion or the inner walls of the rim 40 in irregular form to require an irregular wrench or providing specially arranged wrench holes 46 in the inner wall of the rim 40.

Loss of gas pressure by leakage in the system is prevented by adequate use of typical so-called O-rings which are usually circular in configuration and in cross section and formed from natural or synthetic rubber or other known yieldable plastic. Thus an O-ring 48 is placed in the annular joint in the corner between the shoulder member 24a and where the mounting ring 18 and its flange 18a join. An O-ring 50 is placed in an annular groove in the top wall of the shoulder member 24a and the under annular face of the annular shoulder 30 of the outer wall member 20. Another O-ring 52 is mounted in the annular lower cylinder portion 26a above the radial lip 34a and between the annular piston wall 34 and the adjacent cylinder wall formed by the shoulder member 24a of the inner wall member 24. To insure against gas loss directly from the carbon dioxide flask 22 to the interior of the tank 10 an O-ring 55 is used at the end of the flask neck 22a where it abuts the inner wall member 24 around the boss 23.

The only other seal required is an O-ring 58 (FIG. 3) which is employed between the differential piston 25 and the inner wall member 24 at their centers adjacent the locus of a pressure regulating valve positioned in the inner end of the illustrated axial bore of the boss 23 at the under side of the inner wall member 24. This valve mechanism involves a small-diameter high-pressure plunger or primary piston element 60 integral with the large low pressure or secondary element of the differential piston 25. The element 60 works in the small end of an axially disposed high pressure stepped cylinder 62 containing the O-ring packing 58 which bears against a pressure shoulder 63 of the element 60 to prevent escape of gas to the vented chamber 35. The small end of the cylinder 62 is formed in a top boss of the member 24 opposite the boss 23 which contains the large portion of the cylinder 62. Since the inner and outer wall members 24 and 20 and the differential piston 25 are all desirably formed from a rigid plastic material they are easily produced in the configurations indicated, and in fact the cost is so low that this unit may be provided as a throw-away unit.

As illustrated, the inner end of the primary piston element 60 is formed as a truncated cone to provide a flat seat for engaging the face of a yieldable disc expansion valve 65 which may be a flat rubber disc, held in the position indicated to cut off gas flow through a gas supply bore or passage 66 leading axially through the primary piston element 60 to the low pressure cylinder 26 on the outer side of the differential piston 25. From the cylinder 26 the gas passes around the piston 25 into the annular cylinder portion 26a and thence by a gas discharge passage 68 to the interior of the tank 10 to pressurize its contents.

The position of the valve 65 is fixed with relation to the moving primary piston element 60, and for this purpose is pressed up against an annular shoulder 74 at the top of the large section of the stepped bore 62. To pass gas around the valve 65, a plurality of vertical ducts 76 is cut in the wall of the lower portion of the bore 62 up to the shoulder 74 and thence radially inward (FIG. 3) to feed gas to the upper portion of the bore 62 for supplying the passage 66 in the piston element 60 at proper times. To retain the valve 65 in such position, it is backed with a perforated metal plate disc 77 provided with radially projecting fingers or lugs 77a (FIG. 4) which slide up in the ducts 76 as the valve is moved to position. An appropriate wrench having prongs to engage in the perforations is applied to the disc and rotated through a short arc to cause the lugs 77a to cut short retention shoulders 75 in the plastic material of which the member 24 is made. Thus the valve disc 65 is held in installed position. An important feature of this valve structure is the employment of a rigid metallic ring washer 78 at the inner or upper side of the yielding disc 65 which tends to cause the rubber or other yielding material of the disc to bulge through the hole at the center of the washer and provide an improved sealing action against the flat end of the truncated cone-like tip of the piston element 60. The material of the valve disc 65 may be any suitable material such as natural rubber, or a synthetic rubber, including neoprene and buna types, or other synthetic plastic, including poly-urethane, and having adequate durability and sealing characteristics in the presence of carbon dioxide and the incident pressures.

In operation of the described valve structure, carbon dioxide in solid or liquid form is charged into the flask 22 which, after installation of the valve 65, is then mounted on the inner wall member 24 as illustrated. The beverage, properly carbonated and refrigerated, having been charged into the tank 10, the inner wall member 24 with the assembled flask 22 and the differential piston 25 are placed in the indicated position in the flanged mounting ring 18, whereupon the outer wall member closure 20 is introduced into the mounting ring 18 and turned down tightly to bind the parts in such assembled position for operation. When the differential pressure in the low pressure chamber 26 (which is the same as that in the tank 10 by reason of the connecting duct 68) falls to a value too low to close the high pressure piston element 60 against the disc valve 65, the high pressure developed in the flask 22 by volatilization of the carbon dioxide lifts the piston element 60 and the entire differential piston 25 to pass high pressure $CO_2$ gas to the low pressure chamber 26 via the bore 66 and thence via the duct 68 into the tank 10 where it serves to apply dispensing pressure to the surface of the beverage and also maintain carbonation of the beverage. Additionally, the refrigerating effect resulting from the gasification of the carbon dioxide tends to maintain a suitably low temperature in the beverage whether the beverage directly contacts the flask 22 or falls below it where cooling is by gas convection currents. When the tank 10 is adequately repressured the gas pressure in the lower pressure chamber 26 works upon the large low pressure side of the differential piston 25 to close the high pressure piston element 60 against the disc valve 65. The charge of liquid carbon dioxide which is accommodated by the flask 22 is adequate to maintain proper pressure in the beverage tank 10 as long as beverage remains, even though the flask is small enough to be readily passed through the opening in the mounting ring 18 to the operative position illustrated.

For the purpose of readily dispensing beverage from the tank 10 when the latter is stored in a household or similar refrigerator, a novel dispensing device is employed which has a relatively long flexible dispensing tube or hose and a diffusing means which reduces frothing or foaming in the glass receiving the dispensed liquid. This device is illustrated in FIGS. 1 and 5 to 8, and includes a hose 85 having an elongatable coil 85a. One end of the hose is attached at 86 to a projecting stem 86a of a stepped plug member 87b insertable into a mounting socket 88 welded in a sloping bottom wall 89 of an inwardly directed pocket 89a formed in a lower side wall portion of the tank 10 by correspondingly deforming such side wall. An annular screw member 87c is rotatably mounted about the stem 86a and is provided with external threads 87d for engagement with cooperating threads 90 in the mounting socket 88. When the member 87c is screwed inwardly it urges the plug member 87b inwardly to a position illustrated in FIG. 5, and since the movement of the plug member is translation only, the hose 85 will not be subject to undesirable twisting. Thus, when the plug 87b is seated as seen in FIG. 5, the exposed portion of the plug 87b and the attached end of the hose 85 are housed in the pocket 89a. As the plug member moves inwardly, the inward reduced stepped end of the plug dislodges inward a cork 91 previously inserted in the bored tip of the socket 88 to prevent loss of beverage and its gas pressure. As the cork is expelled, the plug is sealed in the stepped bored socket 88 by means of an O-ring 92 seating against an annular stepping shoulder 92a. The final operative position is that of FIG. 5 where the bore 87a of the plug 87b connects the interior of the tank 10 with the passage through the hose 85.

To maintain the coil 85a of the hose 85, a coiled wire 93 is employed, which may be mounted within the hose or otherwise attached thereto as desired so as to maintain the coil and also permit some elongation of the hose as needed.

The free end of the hose 85 is connected with a leaf spring clamp 95 by being passed through a clamp hole 96 therein, and its extremity is attached to the intake end 97 of a flaring nozzle 98 which serves further to effect gas diffusion and reduce foaming of the beverage being dispensed.

The flared dispensing nozzle 98, whose outer end may be square as seen in FIG. 8, conveniently is cast and provides an overhanging lip 99 to clamp the fixed end of the leaf clamping spring 95 so that its swinging curved end at the locus of the hole 96 therein may move transversely in a complementary hole in a rigid backing wall 98a of the nozzle 98 and preferably integral therewith. The leaf spring 95 is biased to move normally upward in the hole in the wall 98a (as the assembly is viewed in FIG. 7) so that a straight bottom wall of the hole 96 clamps the tube 85 up against the flat wall 98a in the illustrated collapsed condition. To dispense the beverage the person drawing the liquid presses the spring 95 down toward the wall 98a against its normal bias, thereby permitting the liquid to flow through the cylindrical hose 85 to the cylindrical or other tubular intake end of the nozzle 98 to which the hose is attached.

With the above described dispensing structure, the coiled tube section 85a and the flared discharge end of the nozzle 98 act as a gradual pressure reducing and diffusing means, thereby reducing foaming of the beverage in the glass or other receptacle into which the liquid is drawn. Since the beverage is under moderate pressure, foaming will occur unless the pressure is reduced gradually to prevent high velocities in the dispensing device. The coiled tube induces eddy currents which in turn increase the dissipation of the pressure energy of fluid coming from the pressured tank. Without the coil a much longer tube would be necessary to exact the same pressure drop without inducing high velocities in the fluid. The diffuser further slows the fluid velocity as it leaves the end and enters the consumer's container. This prevents splashing and violent stirring which induce foaming.

While the differential valve assembly in the top of the tank is intended to be a throw-away item, the dispensing device, wherein the dispensing plug 87b and the diffuser nozzle 98 are also produced from plastic castings or moldings, is intended for repeated use with successive tanks or kegs of beverage. In the second form of the invention now about to be described, the parts generally are intended to have repeated use, whether made from metal or plastic.

In the form of the invention illustrated in FIGS. 9 to 15, the construction of the regulator valve, while being specifically different from that of the form of FIGS. 1 to 8, is in general the same in that it includes similar inner and outer wall members and an intervening monolithic differential piston which controls substantially the same disc valve element supplied with high pressure carbon dioxide gas from a similar flask. A significant difference, however, is that the outer wall member or closure member is provided with a dispensing connection so that a single opening provided in the bottom of the beverage tank suffices for both the mounting of the regulator valve structure and the dispensing means.

More particularly, in this second form, a beverage tank 110 has a single opening 112 provided in the bottom of the tank, as seen in FIGS. 9 and 10, to receive a combined regulator valve and dispensing means. Whereas, in the first form, the regulator valve and its mounting are depressed within the confines of the beverage tank wall, in this second form, especially since the dispensing means must project from the bottom of the tank, an annular supporting skirt 114 is welded at 114a in position on the bottom of the tank and around the opening 112. A transverse carrying handle 115 is desirably welded across one side of the skirt 114 in a location to avoid interference with access to the opening 112 for installation and removal of the regulator valve unit. For receiving such unit, there is welded in sealing position in the opening 112, as indicated at 116, an annular mounting ring 118 which may be internally flush with the inner wall of the tank 110 and which projects externally into the space within the skirt 114.

The ring 118 removably receives in sealed relation an outer member 120 which acts as a closure plug and also serves as a body member to support a steel carbon dioxide flask 122 and position it within the tank 110 where vaporization of the carbon dioxide aids in cooling the beverage contents of the tank. For directly mounting the flask 122, it is provided with an internally threaded neck 122a which is threadedly mounted upon an externally threaded boss 123 integrally upstanding from an inner member 124 which is fixedly but removably retained above a monolithic rigid differential piston 125 working in a stepped cylindrical chamber 126 provided within the plug or outer member 120.

The under side of the periphery of the inner member 124 rests upon an inner annular shoulder 128 of the plug-like outer member 120 disposed around the stepped cylindrical chamber 126, and such position of the wall member 124 is maintained by a snap ring 130 which snaps into an inwardly faced groove 132 at the upper end of the inner wall of the outer member 120. The differential piston 125 thus works between the outwardly disposed portion of the outer member 120 and the inner member 124. The peripheral portion of the piston 125 has an upstanding annular integral wall portion 134 provided with an annular radial lip 134a which works in the stepped cylindrical chamber 126. The piston 125 and the inner member 124 provide between them a working space and pressure equalizing chamber 135 that is vented to the atmosphere through a duct 136 indicated in FIGS. 13 and 14.

The outer member or body member 120, which, along with the piston 125, inner member 124 and corresponding parts of the other form, is also monolithic, is insertable into its mounting ring 118 after assembly with the differential piston 125, the inner member 124 and the carbon dioxide flask 122, these parts thus being installed as an operative unit. To accomplish such installation, the outer member 120 is provided with an integral radially directed annular flange 118*a* that bears against an inner overhanging annular flange 142 integrally carried by the mounting ring 118. This relation is maintained by a special snap ring 144 received in an inwardly facing groove 145 in the outward portion of the ring 118.

The snap ring 144 is special in the sense that it has distinctively formed engageable end portions 146 requiring a special unlocking tool, thereby discouraging unauthorized persons from disassembing the device. In addition to the action of the snap ring 144 for retaining the flange 140 against the retention flange 142, carbonating pressure in the beverage contained in the tank 110 under operative dispensing conditions will exert such pressure upon the snap ring 144 through the medium of the assembled unit that removal of the snap ring will be virtually impossible until the gas pressure in the system has been exhausted.

Loss of pressure by leakage in this system also is prevented by means of typical so-called O-rings which are circular in configuration and usually circular in cross section. These O-rings, which are produced from natural or synthetic rubber or other suitable yieldable and compressible plastic, are received in appropriate annular grooves or against shoulders provided at the various joints in the system. Thus, an O-ring 148 and corresponding retaining groove are provided in the inner annular wall of the mounting ring 118 to seal against the outer annular wall of the flange 140 of the member 120. Similarly, an O-ring 150 and groove or shoulder are provided in the peripheral wall 124*a* of the inner member 124 to seal against the inner annular wall 120*a* of member 120, and an adjacent O-ring 152 (FIG. 14) is disposed under the outward annular lip 134*a* of the piston 125 to work against the wall of the cylindrical chamber 126. Another O-ring seal 155 is provided against a shoulder at the top of the boss 123 of the inner member 124 and seals between the boss 123 and the adjacent wall of the flask 122 secured on the neck 123.

The only other seal required is an O-ring seal 158 at a small-diameter high-pressure or primary piston element 160 formed integrally with the large element or secondary piston 125 and centrally located on the axis of the dispensing unit to work in a high-pressure chamber 162 provided at the lower end of a stepped bore 164 (FIG. 11). Here, the primary piston element 160 provides a shoulder 163 upon which the O-ring seal 158 rests and against which it is forced by the pressure of carbon dioxide gas from the capsule or flask 122, the seal taking effect by reason of the gas pressure against the wall of the bore.

The top of the primary piston element 160 is in the form of a truncated cone, as seen in FIG. 11, to provide for proper engagement with a disc expansion valve 165 that is disposed above the upper end of a gas supply passage 166 leading into the low pressure chamber 126 at the under side of the secondary piston portion of the differential piston 125. A discharge duct 168 leads from the low pressure chamber 126 upward through the annular wall of the body member 120 to discharge carbonating and pressurizing gas into the beverage in the tank 110.

Since it is preferred to use liquid carbon dioxide in the flask 122, and since it is important that none of such liquid reach the expansion valve and parts of the moving differential piston 125, a rigid upstanding gas conduit 170, preferably of truncated cone configuration, is fitted into the top of the bore 164 and extends up to the center of the flask 122. The flask is charged with a bit less than half its capacity of liquid carbon dioxide, and as a result no liquid will flow into the tube or conduit 170, whatever its angular position. Thus, no liquid will reach the expanison valve 165 or the moving differential piston 125 which could otherwise freeze the parts on expansion. Disposed in the bore 164 immediately under the conduit 170 there is located a porous sintered metal filter block 172 which also may be fitted into position and bears upon the expansion valve 165. This filter block serves the double purpose of preventing foreign solids from reaching the valve 165 and of tending to prevent frozen carbon dioxide ("Dry Ice") from passing to the valve 165 and beyond.

The position of the valve 165, when in operative position, is fixed with relation to the moving primary piston element 160. For this purpose it is pressed into position upon an annular shoulder 174 at the base of the stepped bore 164 and there retained by the filter block 172 which in turn is supported by another annular shoulder 175 in the bore wall. To pass gas around the valve 165, a plurality of vertical ducts 176 extend from above the annular shoulder 175 around the periphery of the valve 165 and down into communication with the high-pressure chamber 162 below the valve 165.

In this manner, which is similar to that with the form of FIGS. 1 to 8, when pressure in the beverage tank 110 drops below the required dispensing pressure, such drop in pressure becomes effective in the low pressure chamber 126 and permits the high-pressure in the bore 162 to move the differential piston structure 125 downward sufficiently to pass high pressure gas through the passage 166 into the low pressure chamber 126 until it has increased sufficiently to lift the piston 125 and again close the inlet port at the top of the passage 166 of the primary piston 160 against the valve 165 and cut off gas flow. An important feature of the valve 165 is found in its specific structure wherein two metallic ring washers 178 or annuli are disposed respectively on the opposite peripheral portions of the yielding washer member 165 which therefore bulges at its center and, by reason of the compression of the contiguous annular portions, provides an improved sealing action against the cooperating, truncated cone-like tip at the top of the piston element 160. The material of the valve disc member 165 may be any suitably yieldable natural or synthetic rubber or rubber composition, such as neoprene or buna type, or any appropriate yieldable synthetic plastic such as poly-urethane or the like, and having adequate durability in the presence of the carbon dioxide and incident high pressures, such as described for the form of FIGS. 1 to 8.

In operation of this form of the invention, as will be apparent from the above disclosure, and as is generally true of the form of FIGS. 1 to 8, carbon dioxide gas will form at the surface of the liquid carbon dioxide charge in the capsule or flask 122 until equilibrium pressure is reached. Beverage charged into the tank 110 will have initially been properly carbonated and refrigerated. When dispensing pressure in the tank 110 drops below the predetermined minimum, such drop registers, by way of the discharge duct 168, in the low-pressure chamber 126 under the low-pressure or secondary portion of the differential piston 125 so that the latter is moved against such low pressure by the high gas pressure working upon the top of the high-pressure or primary piston element 160, such high-pressure gas passing by way of the passage 166 into the low pressure chamber 126 until differential pressure in the latter lifts the piston 125, and the seating top of the element 160 is closed against the expansion valve 165 to close the port leading into the gas passage 166 and cut off flow of high-pressure gas. In this form, the outer end of the duct 168 is closed by a non-return valve 180 which conveniently is a self-collapsing piece of tubing that is mounted by attaching to a rigid sleeve 182 set into the adjacent portion of the outer or body member 120. Since the flask 122 is immersed in the contents of the tank 110, full benefit is obtained in the beverage of cooling resulting from volatilization of the liquid carbon dioxide. The characteristics of liquid carbon dioxide, as well as Dry Ice, are such that liquid carbon dioxide filling a little less than half the capacity of the flask 122 is adequate to provide for complete dispensing of the contents of a tank 110 even where a small flask 122, such as generally indicated, is used and which will readily pass through the mounting ring 118 when attached to the outer member 120 as a part of the pressurizing and carbonating unit.

For the purpose of dispensing the carbonated beverage in the tank 110 a hose 185 is desirably used. This hose leads to a dispensing channel or port 186 through the upstanding annular portion of the outer or body member 120, and is mounted by means of a rigid sleeve connector 188 fitted into the member 120, an appropriate clamp ring 190 being employed to secure the hose 185 to the sleeve 188. Preferably this hose 185, like the piece of tubing 180, is also self-collapsing when not filled with fluid at higher pressure than that of the external pressure. At the discharge end of the dispensing hose 185 (which extends through an opening 192 in the skirt 114), there is applied a typical spring metal compression clip 195 which acts adequately to collapse the dispensing hose and retain the beverage contents under the dispensing pressure which is commonly around 12 to 14 pounds. This clamping relation is in both FIGS. 10 and 15, the latter indicating a circular hole 196 in the clip through which the hose extends.

It will be apparent that the described apparatus may be readily filled and may be easily kept in a household refrigerator for ready dispensing of properly carbonated and pressurized beverage until the contents of the beverage tank 110 have been exhausted, and that at such time liquid carbon dioxide in at least a small amount will still remain in the flask 122.

In exposition of further technical aspects of this improvement, and by way of example, a desirable tank pressure at which such beverages as beer should be dispensed may be assumed to be around 12 to 14 p.s.i. (pounds per square inch) at a temperature of 45° F. It is known that the vapor pressure of liquid carbon dioxide at that temperature is 606 p.s.i. absolute, and that, if the barometric pressure is 14 p.s.i., the resulting $CO_2$ tank pressure is 592 p.s.i. gage. This gage pressure acting on a high-pressure or primary piston member 60 or 160 having a diameter of 0.25 inch and an area of 0.049 sq. in. produces a force of 29 pounds to open the expansion valve 65 or 165. Then as the pressure behind the larger low-pressure or secondary piston member 25 or 125 increases, and if the secondary piston area is 2.4 sq. in., it will require 12 p.s.i. working against the larger area to overcome the force of the primary piston and return the primary piston member to its seat against the expansion valve. This valve relationship will endure until the force balance becomes unequal due to a lower tank pressure or beverage pressure made effective through the duct 68 or 168 in the low-pressure chamber 26, or 126, whereupon pressure is rebuilt past the expansion valve 65 or 165. While minor variations may be expected due to barometric pressure changes, friction and the like, these do not affect the fundamentals and the efficient operation of the present pressurizing apparatuses.

It is intended to cover all variations of the invention within the scope of the claims.

What I claim as my invention is:

1. In combination in a pressurizing device for attachment at an opening of a carbonated beverage tank:
   a mounting member carrying a relatively fixed inner member to be faced into the tank and a relatively fixed outer member;
   means for securing said mounting member in said tank opening;
   a carbon dioxide container secured to said inner member to project into the interior of the tank;
   a valve member mounted in a high pressure central bore in said inner member disposed to receive gas under pressure from said container; and
   a packed differential piston reciprocably mounted in a working cylinder between said wall members and forming a large secondary piston element and a small primary piston element having a duct sealable against said valve member to cut off high pressure gas from said container, said duct leading through said secondary piston element to a low-pressure portion of said cylinder between the piston and said outer member, one of said inner and outer members having a first duct therein leading from said low-pressure cylinder portion to an outlet adjacent said container communicating with the beverage tank, said differential piston and said inner member forming an atmospheric chamber between them, and at least one of said inner and outer members having a second duct leading externally to the atmosphere from said atmospheric chamber.

2. A combination as in claim 1 wherein said inner member is a packed element fixedly and removably secured in a cylinder portion of said mounting member concentric with said bore of said inner member, and said bore is disposed in a concentric boss of said inner member, said container being removably fixed on said boss in packed relation.

3. A combination as in claim 1 wherein said valve member is a disc valve of sealing material having a central portion presented to said duct of said primary piston element and the annular portion of said disc is reinforced by rigid means held in compressing condition in said bore.

4. In combination:
   a beverage tank having an opening therein and a mounting ring secured in sealing relation in said opening;
   an outer member of a pressurizing device having an outer wall and an integral annular wall removably secured in said mounting ring in packed and fixed relation;
   a differential piston mounted in a cylinder provided in said outer member within said annular wall and adjacent said outer wall, said outer wall and said piston forming between them a low-pressure working cylinder, said piston carrying on its side opposite said low-pressure cylinder an inwardly directed primary piston element having a duct leading through the piston to said low-pressure chamber to supply the latter;
   an inner member removably fixed in packed relation to said outer member and forming a bore receiving at one end in packed relation said primary piston element;
   a carbon dioxide container of a size to pass through said mounting ring and secured in sealed relation to the inner side of said inner member and communicating with said bore; and
   an expansion member in said bore between said container and said primary piston element to close said duct in such piston element, said differential piston and said inner member forming between them an atmospheric chamber vented to the atmosphere, one of said inner and outer members providing duct means leading from said low pressure cylinder to the interior of said tank to supply the latter.

5. In combination in a pressurizing device for attachment at an opening of a carbonated beverage tank:
   a mounting ring to be secured in the tank opening;
   an outer member mounted in said mounting ring;
   an inner member removably mounted and sealed in an inner portion of said mounting ring and having a high pressure bored portion extending away from said ring to be disposed in the tank and adapted to receive a carbon dioxide flask in sealed relation, said inner member having a boss portion extending toward said outer member, said inner and outer members forming a working cylinder between them;

a differential piston disposed to work in said cylinder and having a large secondary piston element providing a low pressure chamber between it and said outer member, and having a small packed primary piston element working in a high pressure cylinder in said boss portion, said primary piston element having a duct leading therethrough to said low pressure chamber, and said inner member having duct means connecting said low pressure chamber with the exterior of the inner member to pressurize said tank, said inner member and said differential piston forming between them a working chamber vented to the atmosphere; and a valve member mounted at the inner end of said high pressure bored portion to close said duct in said primary piston.

6. A combination as in claim 5 wherein said valve member includes a valve disc of yielding material and a rigid metal disc having radial lugs extending into the walls of the bore and pressing the yielding disc into sealing relation.

7. In combination in a pressurizing device for attachment at an opening of a beverage tank:
- an outer member;
- a relatively fixed inner member to be faced into the tank and carried by said outer member;
- means for securing said outer member in said tank opening;
- a carbon dioxide container secured to said inner member to project into the interior of the tank;
- a rigid conduit having one end rigidly carried by said inner member and having its other end projecting into said container;
- a valve member mounted in a central bore in said inner member adjacent said rigidly carried end of said conduit;
- and a packed differential piston reciprocably mounted in a working cylinder in said outer member and forming a large secondary piston element and a small primary piston element having a duct sealable against said valve member to cut off high pressure gas from said conduit, said duct leading through said secondary piston element to a low pressure portion of said cylinder between the piston and said outer member, said outer member having a first duct therein leading from said low pressure cylinder portion to an outlet adjacent said container to communicate with the beverage tank, said differential piston and said inner member forming an atmospheric chamber between them, and said outer member having a second duct leading externally to the atmosphere from said atmospheric chamber.

8. A combination as in claim 7 wherein said inner member is a packed element fixedly and removably secured in a cylinder portion of said outer member concentric with said bore of said inner member and said bore is disposed in a concentric boss of said inner member, said container being removably fixed on said boss in packed relation.

9. In combination:
- a beverage tank having an opening therein and a mounting ring secured in sealing relation in said opening;
- an outer member of a pressurizing device having an outer wall and an integral annular wall removably secured in said mounting ring in packed and fixed relation;
- a differential piston mounted in a cylinder provided in said outer member within said annular wall and adjacent said outer wall, said outer wall and adjacent said outer wall, said outer wall and said piston forming between them a low pressure working cylinder and said outer member having a first duct leading from said low pressure cylinder into communication with the interior of said tank, said piston carrying on its side opposite said low pressure cylinder an inwardly directed primary piston element having a second duct leading through the piston to said low pressure chamber to supply said first duct;
- an inner member removably fixed in packed relation to said annular wall and forming a bore receiving at one end in packed relation said primary piston element;
- a carbon dioxide container of a size to pass through said mounting ring and secured in sealed relation to the inner side of said inner member communicating with said bore; and
- an expansion member in said bore between said container and said primary piston element to seal said second duct in such piston element, said differential piston and said inner member forming between them an atmospheric chamber, and said inner member providing passage means venting said atmospheric chamber to the atmosphere.

10. A combination as in claim 9 wherein said expansion member is a disc valve of resilient material reinforced around its edge portions with rigid means exposing the central portion of the resilient material to said second duct and compressing the peripheral portions.

11. A combination as in claim 10 wherein a sintered metal filter bears upon said reinforced disc valve and is disposed between said valve and said carbon dioxide container.

References Cited by the Examiner

UNITED STATES PATENTS

| 422,906 | 3/90 | Booth | 251—10 |
|---|---|---|---|
| 573,083 | 12/96 | Gingrich | 239—597 |
| 1,809,999 | 6/31 | Wier | 239—597 |
| 1,915,123 | 6/33 | Downs | 222—4 X |
| 2,086,000 | 7/37 | Roren | 222—399 X |
| 2,553,040 | 5/51 | Greene | 239—373 |
| 2,741,406 | 4/56 | Matson | 222—538 X |
| 2,872,951 | 2/59 | Wilkerson | 222—399 |
| 2,879,003 | 3/59 | Finn | 239—592 |
| 2,954,935 | 10/60 | Stearns et al. | 239—373 |
| 2,973,885 | 3/61 | Ferguson | 222—399 |
| 2,976,897 | 3/61 | Beckworth | 222—399 |
| 2,978,189 | 4/61 | Metz et al. | 239—597 |
| 3,053,422 | 9/62 | Tenison et al. | 222—399 |
| 3,094,152 | 6/63 | Kenny et al. | 239—373 |

FOREIGN PATENTS 447,765  4/48  Canada.

RAPHAEL M. LUPO, *Primary Examiner.*

LOUIS J. DEMBO, ROBERT A. O'LEARY, *Examiners.*

UNITED STATES PATENT OFFICE
CERTIFICATE OF CORRECTION

Patent No. 3,211,350            October 12, 1965

Albert William Brown

It is hereby certified that error appears in the above numbered patent requiring correction and that the said Letters Patent should read as corrected below.

Column 1, line 57, for "communicaitng" read -- communicating --; column 12, lines 6 and 7, strike out "said outer wall and adjacent said outer wall,".

Signed and sealed this 19th day of July 1966.

(SEAL)
Attest:

ERNEST W. SWIDER
Attesting Officer

EDWARD J. BRENNER
Commissioner of Patents